[19] United States Patent
Buss

[11] 4,213,310
[45] Jul. 22, 1980

[54] THERMAL CONTAINER WITH QUICK-RELEASE LID-MOUNTED FLASK
[75] Inventor: Kenton A. Buss, Oxford, Kans.
[73] Assignee: Igloo Corporation, Houston, Tex.
[21] Appl. No.: 18,002
[22] Filed: Apr. 3, 1979
[51] Int. Cl.² .............................................. F25D 3/08
[52] U.S. Cl. ...................................... 62/457; 206/544; 220/23
[58] Field of Search ................... 62/371, 457; 220/23, 220/324; 206/544

[56] References Cited
U.S. PATENT DOCUMENTS

| 2,632,311 | 3/1953 | Sullivan | 62/457 |
| 3,338,068 | 8/1967 | Piker | 62/457 |
| 3,387,650 | 6/1968 | Hoffmann et al. | 62/457 |
| 3,406,532 | 10/1968 | Rownd et al. | 62/457 |
| 3,979,007 | 9/1976 | Thornbloom, Jr. | 220/23 |
| 4,019,340 | 4/1977 | Conklin | 62/371 |
| 4,024,731 | 5/1977 | Branscum | 62/457 |
| 4,050,264 | 9/1977 | Tanaka | 62/457 |

Primary Examiner—Ronald C. Capossela
Attorney, Agent, or Firm—Fulbright & Jaworski

[57] ABSTRACT

A thermal container with a lid-mounted quick-release flask. The container has a lid which is pivotally mounted to a body, a hollow flask for thermal material mounted in the lid, and a locking mechanism which releasably secures the lid to the body and releasably holds the flask in the lid.

12 Claims, 7 Drawing Figures

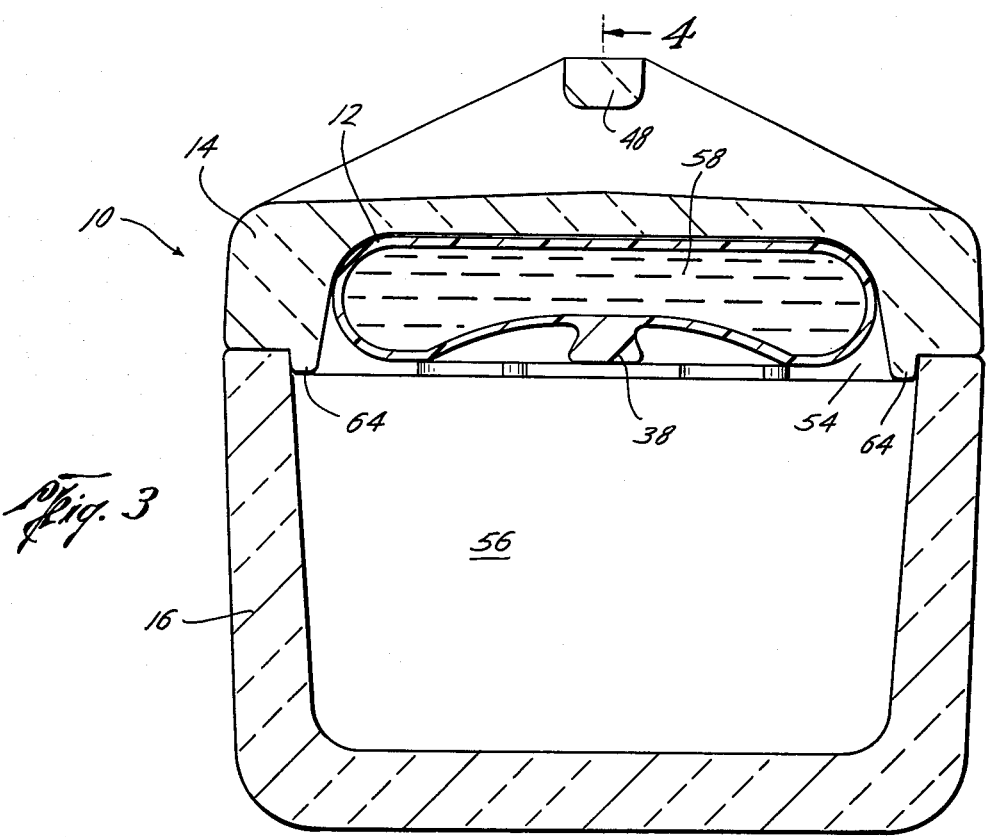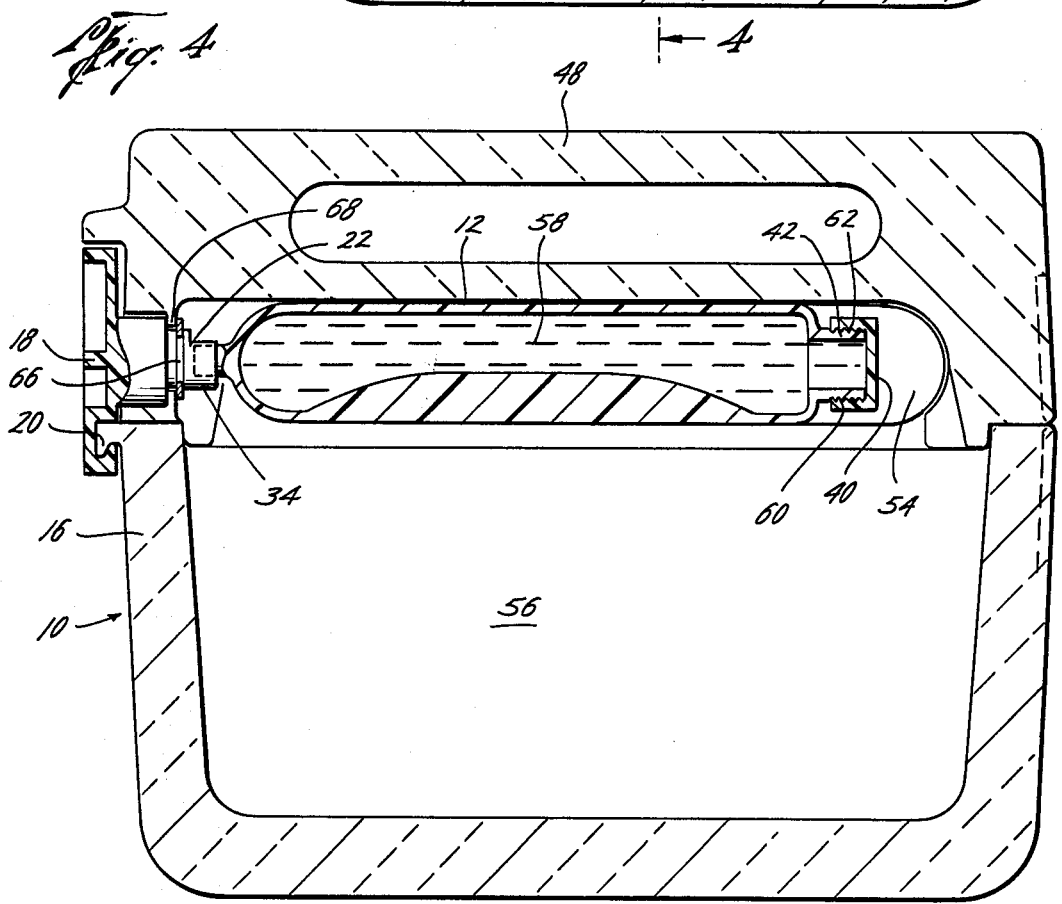

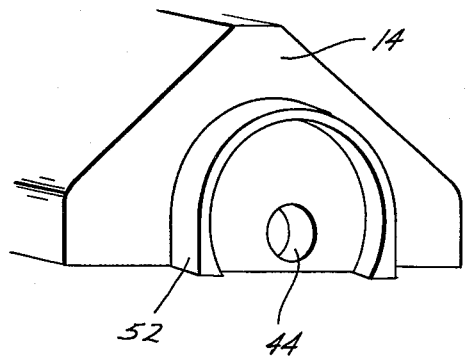
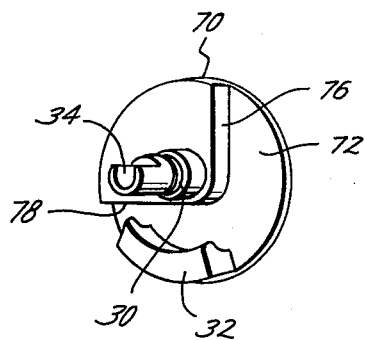
Fig. 5
Fig. 6
Fig. 7
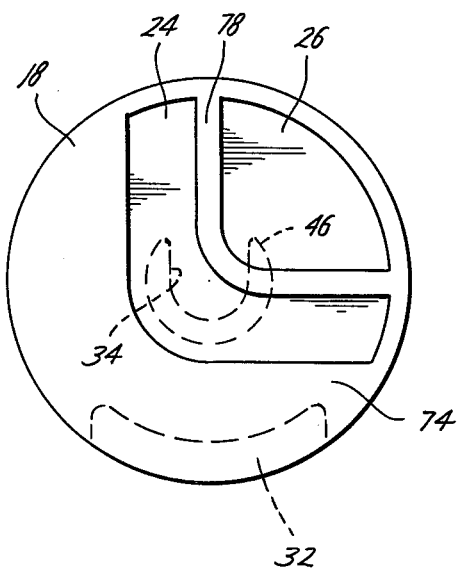
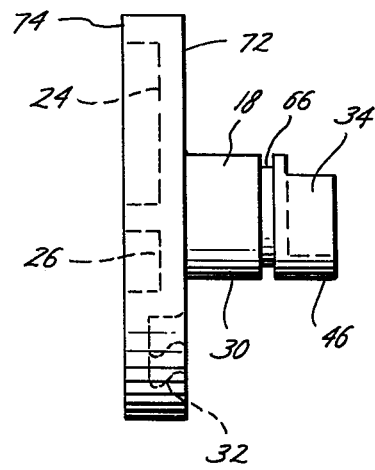

THERMAL CONTAINER WITH QUICK-RELEASE LID-MOUNTED FLASK

BACKGROUND OF THE INVENTION

1. Field of the Invention

This invention relates to the field of thermal containers which are used to maintain the temperature of their contents.

2. Description of the Prior Art

The prior art discloses various types of containers and enclosures which insulate or refrigerate their contents; but there is no disclosure in the prior art of a container having a quick-release lid-mounted thermal flask. U.S. Pat. No. 4,050,264 discloses a refrigerating container in which a freezing material is enclosed in an inner lid which is set down in contact with the contents of the container. U.S. Pat. No. 4,024,731 discloses a container having refreezable lid-mounted bottles which are held in place with threaded studs. U.S. Pat. No. 4,019,340 discloses a thermal enclosure having a hollow cover which contains refrigerant gel. U.S. Pat. No. 3,406,532 discloses a food and beverage container which has hollow integral compartments containing a freezable liquid. U.S. Pat. No. 3,387,650 discloses a thermal receptacle having an insertable tray which holds either a cold or heat delivering material above the contents of the receptacle. U.S. Pat. No. 2,632,311 discloses an insulated container having a lid-mounted rack for holding dry ice. None of these patents alone or in combination teach or suggest the characteristics, advantages, and uses inherent in the container according to the present invention.

SUMMARY OF THE INVENTION

The present invention is directed to a container having a locking mechanism which can both secure the container in a tightly shut configuration and can secure a thermal reservoir in place. The present invention is generally a container having a lid which is pivotally mounted to a body which holds the contents of the container. A locking mechanism is mounted in the lid of the container which can both lock the lid to the body and, at the same time, hold a hollow flask in position on the underside of the lid. The hollow flask holds the thermal material which is used to either heat or cool the interior of the container. The locking mechanism is so constructed that when the lid of the container is open, the flask can be quickly released from its mounting position.

It is, therefore, an object of the present invention to provide a container which will maintain the temperature of its contents by a releasable thermal flask.

A further object of the present invention is the provision of such a container having a lid on which is mounted a releasable flask containing thermal material for either heating or cooling the contents of the container.

Another object of the present invention is the provision of such a container which has a locking mechanism which holds the lid of the container securely shut and simultaneously releasably secures the flask to the lid.

Yet another object of the present invention is the provision of such a container in which the locking mechanism holds the flask securely in place on the underside of the lid while the locking mechanism is actuated to open and close the top and may be actuated to release the flask only when the lip is opened.

A still further object of the present invention is the provision of such a container in which the thermal material in the flask is any suitable material such as aqueous solutions, liquids, and gelatinous materials.

Other and further objects, features, and advantages will be apparent from the following description of the presently preferred embodiment of the invention, given for the purpose of disclosure and taken in conjunction with the accompanying drawing.

DESCRIPTION OF THE DRAWINGS

In the drawings forming a part of the disclosure herein,

FIG. 3 is an end cross-sectional view of the container of the present invention with the lid in the closed position.

FIG. 4 is a cross-sectional view of the container of the present invention with the lid closed taken along line 4—4 of FIG. 3.

FIG. 5 presents a fragmentary perspective view of the lid of the container of the present invention and a perspective view of one side of the locking mechanism of the container.

FIG. 6 is an elevational view of the other side of the locking mechanism of the present invention.

FIG. 7 is a side elevation view of the locking mechanism of the container of the present invention.

DESCRIPTION OF THE PREFERRED EMBODIMENT

Figure 1:
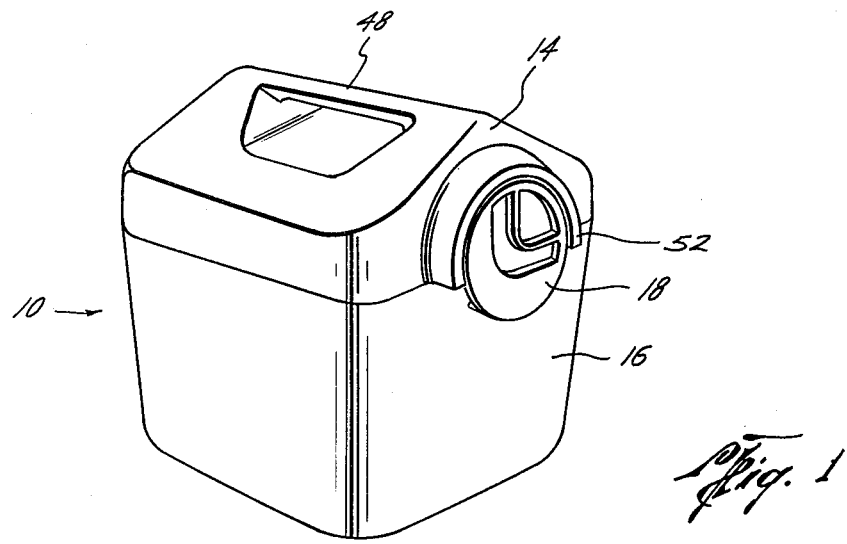
FIG. 1 is a perspective view of the container of the present invention with the lid closed.
Figure 2:
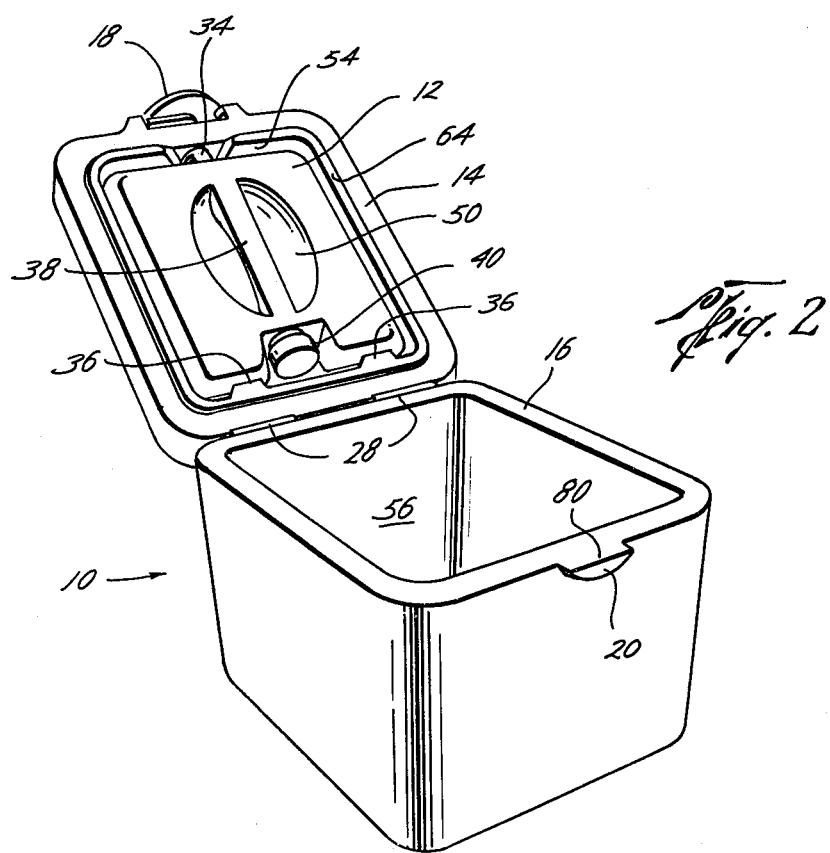
FIG. 2 is a perspective view of the container of the present invention with the lid open.

Referring now to the drawings, the container of the present invention is represented generally by the reference numeral 10. The container 10 is formed of a suitable insulating material. As shown in FIGS. 1 and 2, the lid 14 of the container 10 is pivotally connected by a pivoting means such as hinges 28 to body 16. Sealing means between the lid 14 and body 16, such as ridge 64, may be provided on the underside of lid 14. Handle 48 is formed integrally of lid 14 to facilitate in the handling and carrying of the container 10. Body 16 has cavity 56 into which is placed the contents of the container. As shown in FIG. 2, a thermal flask 12 is positioned in a chamber 54 of the lid 14 for thermally heating or cooling the contents in the cavity 56.

Referring now to FIGS. 1-7, a locking mechanism 18 includes circular body member 70 which has a first side 72, and second side 74, has formed integrally thereof shaft 30, and boss 32. The tip 46 of shaft 30 is formed in the shape of a hollow partial cylinder which defines a support 34 for releasably supporting a stub 22 on the flask 12. Circumferential recess 66 is formed integrally of shaft 30. Shaft 30 extends through and beyond bore 44 of lid 14. C-Ring 68 is insertable in bore 44 and coacts with and is insertable in circumferential recess 66 to secure locking mechanism 18 in bore 44. Ridge 52 is formed integrally of lid 14 and provides a partial protective shield for the locking mechanism 18. Gripping means may be formed integrally of the second side 74 of the circular body member 70 for facilitating the rotation of the locking means 18 such as indentations 24 and 26 which define an actuating rib 78.

Locking mechanism 18 is mounted so that upon closing of the lid 14, and rotation of locking mechanism 18, boss 32 engages and is positioned under lip 20 which is formed integrally of body 16 thereby securing lid 14 tightly in contact with body 16. Flask 12 is held in position in chamber 54 by shoulders 36 at one end and by the coacting of stub 22 which is formed integrally of the other end of flask 12 with support 34 of tip 46. Locking mechanism 18 is designed so that while the lid 14 is being opened or locked shut, part or all of support 34 will coact and support the stub 22 to hold flask 12 in place. When the quick release of flask 12 is desired, locking mechanism 18 is rotated so that the support 34 is moved from the underside of stub 22 and stub 22 is exposed at which point flask 12 ca be easily removed from its position in chamber 54 of lid 14. Flask 12 may be provided with gripping means such as rib 38 and grooves 50 so that it can be grasped easily. Flask 12 may be provided with closing means such as coacting spout 42 through which thermal material 58 can pass and cap 40 which has interior threads 62 which mate with exterior threads 60 of spout 42.

First shoulder 76 and second shoulder 78 are formed integrally of the first side 72 of the circular body member 70 of the locking means 18. Each shoulder performs a stop function by coacting with a flat top surface 80 of lip 20. When lid 14 is moved into contact with body 16 and locking mechanism 18 is rotated clockwise to lock lid 14 down, and when boss 32 has engaged and is substantially under lip 20, at that point in the rotation second shoulder 78 contacts and coacts with top surface 80 of lip 20 to prevent clockwise movement of the locking mechanism 18 thereby ensuring that boss 32 will remain in engagement with lip 20 and ensuring that stub 22 of the flask 12 is supported by support 34. In a similar manner when locking mechanism 18 is subsequently rotated counterclockwise in order to disengage boss 32 from lip 20 and when boss 32 has become completely disengaged, first shoulder 76 contacts and coacts with top surface 80 of lip 20 to prevent further counterclockwise movement of locking mechanism 18. Therefore, the shoulders 76 and 78 also insure that the flask 12 is not inadvertantly released when opening and closing the lid 14.

The present invention, therefore, is well adapted to carry out the objects and attain the ends and advantages mentioned as well as others inherent therein. While a presently preferred embodiment of the invention has been given for the purpose of disclosure, numerous changes in the details of construction, the combination, shape, size and arrangement of parts may be resorted to without departing from the spirit and scope of the invention.

What is claimed is:

1. A container for maintaining the temperature of the contents placed therein comprising
   a body having a cavity for holding the contents,
   a lid pivotally secured to the body for closing the cavity of the body, said lid having a top, and an underside,
   a flask for holding a thermal material which is heated or cooled as desired to maintain a hot or cold temperature in the cavity, and
   a single locking means mounted on the lid for simultaneously locking the lid and the body together and for releasably securing the flask in position on the underside of the lid.

2. The container of claim 1 wherein a sealing means is provided on the lid, said sealing means coacting with the body to seal the container when the lid is closed.

3. The container of claim 1 wherein the flask has a closable opening for introducing or removing the thermal material from the flask.

4. The container of claim 1 wherein the flask is secured in an open chamber which is formed integrally of the underside of the lid.

5. The container of claim 4 wherein a supporting means is provided on the underside of one end of the lid for supporting one end of the flask in position in the chamber.

6. The container of claim 5 wherein the holding means comprises a plurality of shoulders formed integrally of the underside of the lid.

7. The container of claim 5 or of claim 6 wherein the lid has a first end and a second end and the holding means is located on the first end and the locking means is located on the second end.

8. The container of claim 1 wherein a stub is formed integrally of the flask, a bore extends through the lid, a locking lip is formed integrally of body, and wherein the locking means includes,
   a circular body member having a first side and a second side, and
   a shaft formed integrally of the circular body member extending from the first side through the bore in the lid,
   a support on the shaft inside of the lid which coacts with the stub wherein rotation of the circular body member will allow the support to alternately support and release the stub.

9. The container of claim 8 wherein surfaces are provided on the lip and on the locking means which coact for limiting the rotation of the locking means and for preventing the release of the flask when the lid is closed.

10. The container of claim 8 wherein the stub is circular and the support is a partial cylinder.

11. The container of claim 9 wherein the surfaces of the locking mechanism include a first shoulder and a second shoulder for limiting the rotation of the locking means in either direction.

12. A container for maintaining the temperature of the contents placed therein comprising
   a body having a locking lip formed integrally thereof and a cavity for holding the contents,
   a lid pivotally secured to the body for closing the cavity of the body, said lid having
   a first end,
   a second end,
   a top,
   an underside,
   a bore therethrough,
   a holding means on the first end on the underside of the lid for supporting the flask in position,
   an open chamber formed integrally of the underside thereof,
   a flask for holding a thermal material which is heated or cooled as desired to maintain a hot or cold temperature in the cavity, said flask secured in the open chamber of the lid, said flask having a circular stub formed integrally thereof, and
   a locking means mounted on the lid for locking the lid and the body together and for releasably securing the flask in position on the underside of the lid, said locking means including a circular body member having a first side and a second side, a shaft formed integrally of the circular body member extending from the first side, the shaft having a partial cylinder support wherein rotation of the circular body member will allow the partial cylinder support to alternately support and release the stub, and surfaces on the locking mechanism which coact with the locking lip for limiting the rotation of the locking means in either direction and for preventing the release of the flask when the lid is closed, the surfaces including a first shoulder and a second shoulder.

* * * * *